United States Patent [19]

Teranishi et al.

[11] 4,379,084
[45] Apr. 5, 1983

[54] PROTEIN MATERIAL AND METHOD FOR THE MANUFACTURE THEREOF

[75] Inventors: Susumu Teranishi; Yōichi Kawasaki, both of Osaka; Tsutomu Katayama, Izumisano; Hitoshi Taniguchi, all of Japan

[73] Assignee: Fuji Oil Company Limited, Osaka, Japan

[21] Appl. No.: 302,353

[22] Filed: Sep. 15, 1981

[30] Foreign Application Priority Data

Sep. 22, 1980 [JP] Japan ................... 55/132076

[51] Int. Cl.³ .................. A23J 1/02; A23J 1/14; A23J 1/16; A23J 3/00
[52] U.S. Cl. ..................... 260/112 R; 260/123.5; 426/656; 426/657
[58] Field of Search .................. 260/112 R, 123.5; 426/656, 657

[56] References Cited

U.S. PATENT DOCUMENTS

| | | | |
|---|---|---|---|
| 3,451,990 | 6/1969 | Solé, Jr. | 260/112 R X |
| 3,662,671 | 5/1972 | Frederiksen | 260/112 UX |
| 3,662,672 | 5/1972 | Hoer | 260/112 UX |
| 4,017,646 | 4/1977 | Hoer et al. | 426/656 |
| 4,197,327 | 4/1980 | Kawasaki et al. | 260/112 R X |

*Primary Examiner*—Howard E. Schain
*Attorney, Agent, or Firm*—Wenderoth, Lind & Ponack

[57] ABSTRACT

A fibrous protein material prepared by dispersing into an aqueous slurry or paste of protein an emulsion containing oil and water phases, and treating the mixture to give fibrous texture. The emulsion used has an external phase which is the oil phase and may contain a flavoring agent in its water phase.

7 Claims, No Drawings

PROTEIN MATERIAL AND METHOD FOR THE MANUFACTURE THEREOF

BACKGROUND OF THE INVENTION

The present invention generally relates to a protein material and a method for the manufacture of the same and, more particularly, to the preparation of a protein material having an excellent taste-sustaining power, i.e., excellent in giving its taste for a prolonged period of time during chewing or mastication.

Various types of fibrous protein materials and methods for the manufacture thereof have long been well known. Of these known methods, exemplary is a wet spinning method wherein a fibrous protein material is manufactured by preparing an alkaline dope from a refined protein and extruding the dope into a coagulant bath through a spinning nozzle, with or without subsequent elongation and passage in contact with an albumin containing binder to form a tow of protein fibers. In this conventional wet spinning method, addition of a flavoring agent to the material before it is spun is generally difficult because the protein fibers tend to break during the elongation, and, therefore, it is a customary practice to add the flavoring agent in the binder. In addition, the conventional wet spinning method requires the use of a highly refined protein and is susceptible to change in pH value to such an extent as to result in difficulty in waste water treatment. Thus, the conventional wet spinning method requires a high operating cost.

There is also known a method wherein a protein slurry is forced to flow in heated condition by the use of a heat-exchanger piping or an ejector to texture into the form of fibers. In this known method, a flavoring agent is added to the protein slurry, or the fibrous material after so formed is contacted with the flavoring agent with or without a binder contained therein.

Where the flavoring agent is added to the slurry, not only is the flavoring agent insufficiently taken up in the fibrous material during the coagulation, allowing a portion thereof to elude into the whey, but also the flavor given by the flavoring agent taken up in the fibrous material tends to vanish in a relatively short period of time during chewing or mastication, thereby lacking a sufficient taste-sustaining power. On the other hand, where the flavoring agent is added to the textured fibrous material, it has been found that the fibrous material lacks a sufficient taste-sustaining power and, specifically, when the fibrous material is boiled in water, the flavoring agent tends to elude considerably from the fibrous material, leaving a relatively small amount of the flavoring agent in the fibrous material.

SUMMARY OF THE INVENTION

Accordingly, the present invention has been developed with a view to substantially eliminating the above described disadvantages inherent in the prior art protein material and has for its essential object to provide an improved fibrous protein material having an emulsion dispersed therein, which emulsion contains both oil and water phases, the external phase of said emulsion being an oil phase.

It is a related object of the present invention to provide a method for manufacturing the fibrous protein material of the type referred to above.

According to the present invention, since the water phase of the emulsion contains a flavoring agent, the fibrous protein material having an excellent taste-sustaining power can be obtained.

These and other objects and features of the present invention will become apparent from the following description taken in conjunction with a preferred embodiment thereof.

DETAILED DESCRIPTION OF THE INVENTION

As hereinbefore described, the present invention provides a fibrous protein material having dispersed therein an emulsion containing both oil and water phases, the external phase of which emulsion is the oil phase.

Examples of the emulsion containing both the oil and water phases, the external phase of which is the oil phase, include so-called water-in-oil type (W/o type) and oil-in-water-in-oil type (o/w/o type), both being stable at ambient temperature. A method for the preparation of these emulsion including selection and use of an emulsifying agent is well known to those skilled in the margarine manufacturing art. This known emulsion making method can be employed to manufacture the emulsion utilizeable in the practice of the present invention without the utmost care required in connection with such methodical conditions as SFI(solid fat content index) of oil and fat, ratio between the oil and water phases and necessity of cooling operation, since no strict adjustment of the viscosity or plasticity is required so much as in the margarine making method. In general, the emulsion utilizeable in the practice of the present invention can be prepared by mixing either the water phase, or the O/W type emulsion which has previously been prepared, with the oil phase melted at ambient or heated temperature and then emulsifying the mixture in the presence of an emulsifier. In order for the emulsified product to retain an stable emulsified state at ambient temperature, it is a technically easy way to prepare the emulsion to be non-fluidizing at ambient temperature and, in addition, the emulsion should preferably be plastic so that the product can give a pleasant mouthfeel. These physical properties of the emulsion are related largely to the melting point of the oil phase and, thereof, can be imparted if the melting point of the oil phase is higher than the ambient temperature and lower than about 45° C. The ratio of the oil and water phases is somewhat affected by the selection of the emulsifier and is preferably such that the amount of the oil phase is 35% or more by weight relative to the total weight of the oil and water phases. By so selecting the ratio, emulsification can readily be achieved. The emulsifier utilizeable in the practice of the present invention may be lecithin, monoglyceride, sugar ester or any other emulsifier used in the prior art, and the emulsification can be carried out by the use of any one of known homogenizing machines, some of which are known as "Votator", "Kombinator", "Perfecter" and "Onrator".

According to the present invention, inclusion of the flavoring agent in the water phase of the emulsion is essential not only to minimize a loss of the flavoring agent which would occur during the formation into fibers, but also to impart the excellent flavor-sustaining power to the final product. However, this essential requirement should not be construed as excluding the possibility of adding an oil-soluble flavoring agent to the oil phase, the possibility of adding an extra flavoring agent to the aqueous slurry or paste of protein, and the possibility of adjusting the flavor of the fibers subsequent to the formation into such fibers. By way of example, when a relatively small amount of the extra flavoring agent is added to the protein material separately from the addition of the same or different flavoring agent to the emulsion, the extra flavoring agent so added serves to compensate for a delay effect of the flavoring agent used in the water phase of the emulsion which would work out upon chewing. If the flavoring agents added to the emulsion and the protein material, respectively, are different from each other, a pleasing and sophisticated taste different from that given by the single flavoring agent can be appreciated.

The addition of the flavoring agent to the emulsion is carried out during the preparation of such emulsion. The flavoring agent which may be used may be one or a combination of an extract of any of animal meats, an extract of any of fish meats, a hydrolysate of protein, a chemical additive, a reaction product of amino-carbonyl, and a sugar.

The emulsion having its external phase in the form of the oil phase is subsequently dispersed and mixed in an aqueous slurry or paste of protein which is a main raw material of the fibrous protein product, and the mixture is then textured into fibers. In the present invention, the addition of the emulsion is carried out before the formation into the fibers and, therefore, drops of the emulsion in the resultant protein material are distributed in such a manner as to exist inside the protein fibers rather than in interstices among the protein fibers. During the period from the preparation of the emulsion to the formation into the fibers, any possible separation of the oil and water phases of the emulsion should preferrably minimized, although a complete avoidance of the oil-water separation is not essential.

Accordingly it is preferrable that the emulsion, (especially when its static stability at the ambient temperature due to its plasticity or its oil phases higher melting point, and it is emulsified at higher temperature) is added to the protein material immediatly after homogenization or the preliminary prepared emulsion is rehomogenized just before the addition. It is also to be noted that the w/o type emulsion is susceptible to result in separation of the oil and water phases from each other when allowed to stand at a temperature higher than about 70° C., and that it is usually treated at a temperature higher than about 70° C. when the aqueous material of protein is to be formed into the fibers. Therefore, during the fiber formation period, the aqueous material of protein should preferably be dynamically treated by means of stirring or forcing to flow without being allowed to stand, thereby minimizing any possible separation of the oil and water phases.

Accordingly, the formation of the aqueous material of protein into the fibers is preferably carried out while it is forced to flow under heated condition. For this purpose, a known method such as disclosed in U.S. Pat. Nos. 3,662,671 and 3,662,762 and Japanese Laid-open Patent Publications Nos. 50-19957 (published in 1975) and 52-98767 (published in 1977), wherein the material is supplied under pressure through a heat exchanger piping and is then discharged through an orifice, or a known method such as disclosed in Japanese Patent Publication No. 49-6665 (published in 1974) wherein an ejector is used, or any one of the known methods respectively disclosed in Japanese Laid-open Patent Publications Nos. 48-33052 (published in 1973), 49-14656 (published in 1974), 49-62662 (published in 1974) and 54-44064 (published in 1979 and corresponding to U.S. Pat. No. 4,197,327) may be employed in the practice of the present invention. However, the known wet spinning method can not be employed for the formation into the fibers because addition of oil and fat can not be carried out with no difficulty.

Of the various fibrillating methods which may be used in the practice of the present invention, the method wherein, either the heat exchanger piping or the ejector is used is generally susceptible to congregation of fibrous components out from the raw material used resulting in separation thereof from the whey. In this method, since the flavoring agent has a higher water solubility than the protein component congregated, addition of the flavoring agent to the protein slurry without being emulsified tends to result in the increased amount of the flavoring agent not taken up in the fibers. However, this known method which appears to be seemingly disadvantageous can effectivety and advantageously used in the present invention with the increased amount of the flavoring agent taken up in the fibers, since the flavoring agent used is enveloped in the oil phase and is therefore imparted a hydrophobic property.

The amount of the emulsion to be added to the aqueous slurry of protein is preferably within the range of about 5 to 50% by weight and more preferably within the range of 15 to 30% by weight relative to the solid content of the protein contained in the slurry. If the amount of the emulsion is smaller than the lowermost limit, a sufficient taste-sustaining power cannot be obtained and if it is larger than the uppermost limit, fibrillation can be hampered.

As hereinbefore described, it is a preferred embodiment of the present invention to add the extra flavoring agent to the aqueous material of protein separately from the addition of the flavoring agent to the water phase of the dispersed emulsion. In this embodiment, in order for the delay effect of the flavoring agent used in the water phase of the dispersed emulsion to be compensated for, the amount of the extra flavoring agent to be a separately added to the aqueous protein material may be smaller than the amount of the flavoring agent used in the water phase of the dispersed emulsion.

The final product, i.e., the fibrous protein material so obtained by the method of the present invention may be used as a material for a meat product, such as hamburger, sausage and dried meat, a fish product, a daily dish such as "denbu" (mashed and seasoned fish), dainty bits, and so on and is effective to give its taste for a prolonged period of time during chewing.

It is to be noted that the addition of the flavoring agent to the protein material according to the present invention does not exclude the possibility of adjusting the taste to be done subsequent to the fibrillation as hereinbefore described. If desired the taste of the protein material subsequent to the fibrillation may be improved by immersing in oil or emulsion or by mixing with a seasoning agent or in any manner described by the user or consumer.

Hereinafter, the present invention will be described in more detail by way of illustrative examples.

EXAMPLE I

An w/o type emulsion was prepared by melting 70 parts of refined palm oil (melting point: 32° C.) at 60° C., adding a small amount of lecithin and glycerin monostearate to the oil, slowly adding to the oil phase 30 parts of a warm solution containing 9 parts of a powdery extract of meat dissolved in 21 parts of warm water, and uniformly mixing the resultant mixture by the use of a homomixer.

20 parts of the emulsion so obtained was dispersed and mixed by the use of a "Tri-Blender" (available from Ladish Co.) with 400 parts of a slurry of protein (acid precipitated curd of soyprotein having a solid content of 25 wt%) which had been adjusted its pH value to 5.0. The mixture of the protein slurry with the emulsion was then supplied under pressure in heated condition (150° C.) through a heat-exchanger piping (Length: 20 m, Diameter: 4 mm) and was discharged to the outside through an orifice of 1.0 mm in diameter to allow it to be fibrilated. The protein fibers so formed were, after coagulation, separated from the whey and was adjusted its pH value to 6.5 by the use of an alkalin, thereby giving the final product, i.e., the fibrous protein material.

For the purpose of comparison with the fibrous protein material so obtained, a comparative protein material was prepared in a manner similar to that described above except that a mixture of the materials used for the emulsion in the above example was not emulsified.

The fibrous protein material of the present invention and the comparative protein material were organoleptically tested as to their taste-surtaining effect by 5 panelists who concluded that the former fibrous protein material was excellent.

In addition, another test was conducted to find the presence and absence of escape of the flavoring agent from each of the protein materials. This test was carried out by immersing each of the protein materials in a water vessel containing water in an amount double by weight of the protein material tested and then rubbing it while in the water vessel by the use of a spatula, the supernatant liquid being subsequently filled into a test tube for analytical observation. The result was that the supernatant liquid given by the comparative protein material were more cloudy than that given by the fibrous protein material, showing that the flavoring agent has eluded from the fibrous material in an amount less than from the comparative protein material. This was also evidenced by the fact that all of the panelists judged that the fibrous protein material of the present invention washed in the manner described above exhibited a higher flavor producing capability than that of the comparative protein material similarly washed.

EXAMPLE II 60 parts of hardened soybean oil (melting point: 37° C.) were melted at 55° C. and was added with a small amount of a mixed emulsifier including lecithin, glycerin monopalmitate and sugar ester. The mixture of the oil and the emulsifier was then added with a warm solution containing both 6 parts of a powdery extract of meat and 2 parts of hydrolysate of protein dissolved in 32 parts of water, and was subsequently emulsified for 15 minutes at 60° C. by the use of a homo-mixer, followed by cooling to 20° C. while continuously stirred. The resultant emulsion was an w/o type emulsion which exhibited a plastic property.

5 parts of the emulsion so obtained was uniformly dispersed in 100 parts of the protein slurry prepared in the manner as in Example I, with or without 0.5 part of a meat extract added separately, by the use of the "Tri-Blender", the mixture of the emulsion with the protein slurry being then fibrillated in the same manner as in Example I to give the fibrous protein material. Both of the products were found excellent in taste-sustaining power. In particular, the product in which the meat extract was added separately from the emulsion gave a more pleasant taste when placed in touch with the tongue.

EXAMPLE III

The same mixture of the emulsion with the protein slurry as in Example I was placed in an autoclave (Volume: 5 l) of a type having a stirring blade, into which vapor was abruptly injected while it was stirred by the stirring blade rotating at 450 r.p.m. The application of the vapor continued for 30 seconds until the mixture was heated to 150° C. and was thereafter interrupted. Simultaneously with the interruption of the application of the vapor, fibrous shreds were formed in coagulated state from the mixture. These fibrous material was then separated from the whey and neutralized to a pH value of 6.5 by the use of an alkalin. The final product so obtained was found excellent in taste sustaining power.

EXAMPLE IV

The same mixture of the emulsion with the protein slurry as in Example I was supplied under pressure through a heat-exchanger coil (Coil length: 20 m, Diameter: 4 mm) to heat it to 150°. The mixture was discharged from the discharge end of the heat-exchanger coil to the atmosphere in an atomized form. The mixture so discharged was allowed to lay on a 30 mesh metallic mesh belt moving at 5 cm/sec at a position 15 cm spaced from the discharge end of the heat-exchanger coil, thereby forming a sheet, 3 mm in thickness and 10 cm in width, of meat-like fibrous masses. This product was also found excellent in taste-sustaining power.

Although the present invention has been described by way of the examples, it should be noted that various changes and modification are apparent to those skilled in the art. Such changes and modifications are to be understood as included within the true scope of the present invention unless they depart therefrom.

We claim:

1. A method for manufacturing a fibrous protein material which comprises the steps of dispersing into an aqueous slurry or paste of protein an emulsion containing oil and water phase, the external phase of said emulsion being the oil phase, to mix said emulsion with said slurry or paste, and forming the mixture into fibrous material.

2. A method as claimed in claim 1, wherein the water phase of the emulsion contains a flavoring agent.

3. A method as claimed in claim 2, further comprising the step of adding another flavoring agent.

4. A method as claimed in claim 3, wherein the addition of said another flavoring agent is carried out subsequent to the fiber formation.

5. A method as claimed in claim 3, wherein said another flavoring agent is added to an aqueous slurry or paste of protein separately from said emulsion.

6. A method as claimed in claim 1, wherein the fiber formation is carried out by forcing the mixture to flow under heating condition.

7. A protein product comprising a fibrous protein material having an emulsion dispersed therein, said emulsion containing water and oil phases, the external phase of said emulsion being the oil phase.

* * * * *